T. M. OBSBOUM.
SAFETY COUPLING DEVICE FOR JEWELRY.
APPLICATION FILED FEB. 23, 1916.
1,209,615. Patented Dec. 19, 1916.
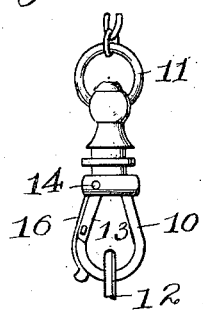
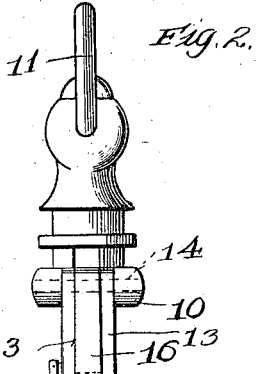
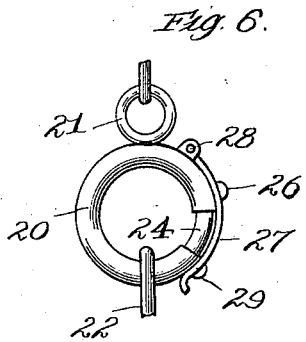
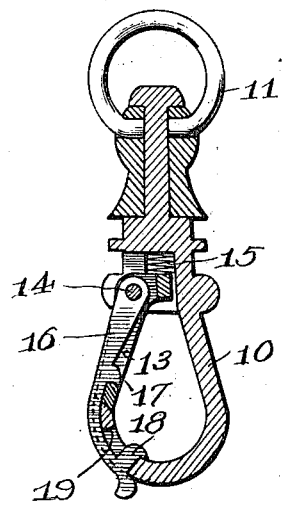
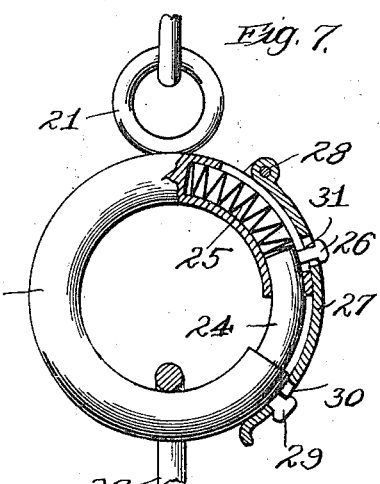
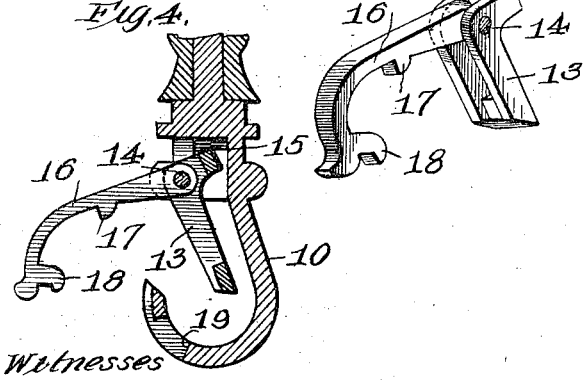
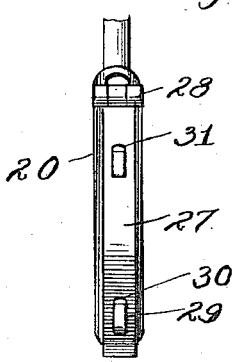
Witnesses
Inventor
Thomas M. Obsboum
By Miller Chindell
Attys

UNITED STATES PATENT OFFICE.

THOMAS M. OBSBOUM, OF CHICAGO, ILLINOIS, ASSIGNOR OF ONE-HALF TO JOHN ZVETINA, OF CHICAGO, ILLINOIS.

SAFETY COUPLING DEVICE FOR JEWELRY.

1,209,615.  Specification of Letters Patent.  Patented Dec. 19, 1916.

Application filed February 23, 1916. Serial No. 79,840.

*To all whom it may concern:*

Be it known that I, THOMAS MAURICE OBSBOUM, a citizen of the United States, residing at Chicago, in the county of Cook and State of Illinois, have invented certain new and useful Improvements in Safety Coupling Devices for Jewelry, of which the following is a specification.

This invention relates to certain improvements in safety hooks, rings, or the like for articles of jewelry, by means of which devices two parts are coupled together. Such a device usually comprises an incomplete ring or body portion having a space between its ends through which a member to be coupled passes within said body portion, and a spring-pressed dog adapted to bridge or close said space.

It is the object of the present invention to provide an improved safety device in which accidental opening of the spring-pressed dog will be effectually prevented.

According to my invention a guard is exteriorly positioned with respect to the dog, the guard being pivoted at one end and extending across the space in the body, yieldable locking means being provided to detachably secure the other end of the guard in its operative position.

In the accompanying drawings, Figure 1 is a side elevation of a safety hook embodying the features of my invention. Fig. 2 is an end elevation on an enlarged scale. Fig. 3 is a longitudinal central section. Fig. 4 is a fragmental sectional view in the same plane as Fig. 3, but showing the parts in another position. Fig. 5 is a perspective view illustrating the locking dog and the protecting guard therefor. Figs. 6, 7 and 8 represent a modified form of my invention, Fig. 6 being a side elevation, Fig. 7 an enlarged side elevation with parts in section, and Fig. 8 an edge elevation looking toward the right-hand edge of Figs. 6 and 7.

Referring first to the construction illustrated in Figs. 1 to 5, the body portion 10 of the hook may be of any suitable construction, being herein shown as provided with a ring 11 for attachment to a device such as a watch-chain. 12 indicates a member which may be a watch-ring to engage in the hook. A locking dog 13 is pivoted near one end on a pivot pin 14 extending between and mounted in two opposed portions on the body, and the adjacent end of the dog is arranged to be acted upon by a coiled compression spring 15 which tends to swing the dog outwardly on its pivot and maintain its opposite beveled end in engagement with the coöperating beveled end of the hook body. Preferably the dog comprises two spaced side portions and between these portions is mounted a guard 16 which is pivoted at one end on the pivot-pin 14 and is arranged to extend along the outer side of the dog 13 and swing outwardly in opening. If desired, the guard may have a lug 17 to frictionally engage the cross-piece at the free end of the dog. Means is provided for detachably securing the free end of the guard to that portion of the body of the hook across the open space from the pivot-pin 14 so as to positively hold the guard in operative position. This means preferably comprises a head or hooked portion 18 on the end of the guard adapted to pass through a slot 19 in the body and snap into engagement with the wall at the edge of the slot, the inherent resiliency of the guard holding it in such engagement, but permitting the guard to be disengaged by pressure of the finger against the out-turned end of the guard.

The modified embodiment of the invention which is illustrated in Figs. 6 to 8 is in the form of a ring comprising a body portion 20 which may, if desired, be provided with the usual attaching device 21 and which is adapted to receive another device 22 to be coupled to the ring. The ends of the body portion are spaced apart to receive said device and the space is adapted to be bridged or closed by a dog 24 which in the present instance is in the form of an arcuate plunger slidable in the hollow body and urged toward its closing position by a coiled compression spring 25 in the body. The dog is provided with a finger-piece 26 which projects out through a slot in the body for operating the dog.

A guard 27 is provided to prevent accidental opening of the dog, said guard being exteriorly positioned with respect to the dog to detachably secure said parts together and being pivoted at one end at 28 to the body so as to swing outwardly in opening. Means is provided for detachably securing the opposite end of the guard to that portion of the body across the open space in the latter, said means comprising in the present instance a headed projection 29 on the body adapted to pass through an opening 30 in the guard and have a hooked engagement therewith. The inherent resiliency of the guard maintains the same in engagement with the headed projection, but permits the guard to be snapped onto the end of the projection by a pressure of the fingers on the end of the guard. The end of the guard is out-turned to facilitate digital engagement therewith. An opening 31 is provided in the guard to accommodate the operating finger-piece 26 of the dog and when the guard is in its closed or operative position it will be impossible to move said finger-piece to open the dog.

The foregoing detailed description is not intended as a limitation of my invention to the exact constructions disclosed. The scope of the invention is pointed out in the appended claims.

I claim as my invention:

1. In an article of jewelry, a body portion having an open space between its ends, a spring-pressed dog arranged to close said space, a guard exteriorly positioned with respect to said dog and pivoted at one end to the body portion and arranged to open outwardly from the latter, said guard extending across the said space, and means near the free end of said guard for detachably securing said guard to the body at the opposite side of said space.

2. An article of jewelry comprising a ring-like body interrupted to provide a space through which an article may be passed within the body, a spring-pressed dog arranged to close said space, a guard pivoted at one end adjacent to said space and extending across the space at the outer side of said dog, and a coöperating projection and opening on the body and the free end of said guard arranged to interlock to hold the guard in operative position, but detachable to permit opening of the guard.

3. An article of jewelry comprising a hook having a space through which a device may be passed into the hook, a dog pivoted near one end to the body on one side of said space, a spring acting on the end of the dog adjacent to its pivot and tending to swing the dog into position to close said space, a guard pivoted at one end adjacent to the pivot of said dog, said guard extending at the outer side of said dog and overlapping the portion of the body at the opposite side of said space from said pivot, the body at this point having an opening, and a yieldable hooked projection on the dog adapted to pass through said opening and engage the wall at one edge of the opening for detachably securing the dog in its operative position.

4. An article of jewelry comprising a ring-like body having a space through which an article may be passed within the body, a spring-pressed dog arranged to close said space, a guard pivoted at one of its ends to the body near one end of the dog and adjacent to said space, said guard extending across said space, means for detachably securing the free end of said guard to the body at the opposite side of said space, and means for detachably securing said dog and said guard together.

In testimony whereof, I hereunto set my hand.

THOMAS M. OBSBOUM.

Copies of this patent may be obtained for five cents each, by addressing the "Commissioner of Patents, Washington, D. C."